Dec. 18, 1951  R. HOFGAARD  2,579,000
REGISTERING DEVICE
Filed Dec. 4, 1946  5 Sheets-Sheet 1
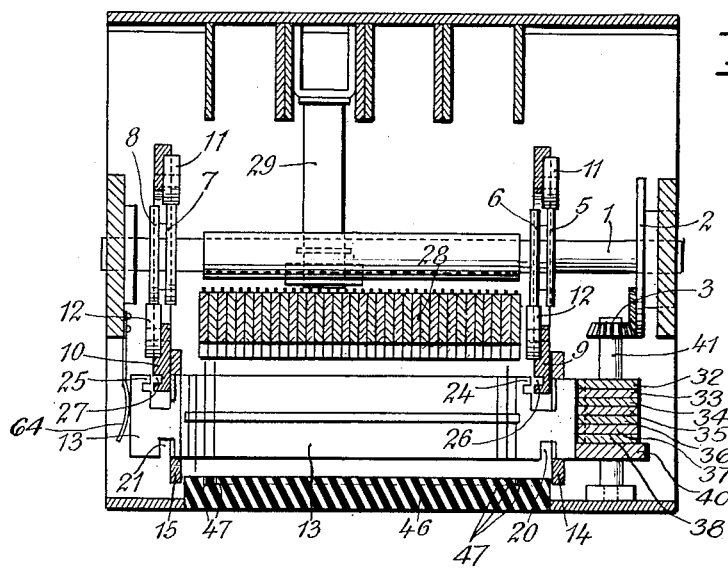
Inventor:
Rolf Hofgaard
By Pierce, Scheffler & Parker
Attorneys

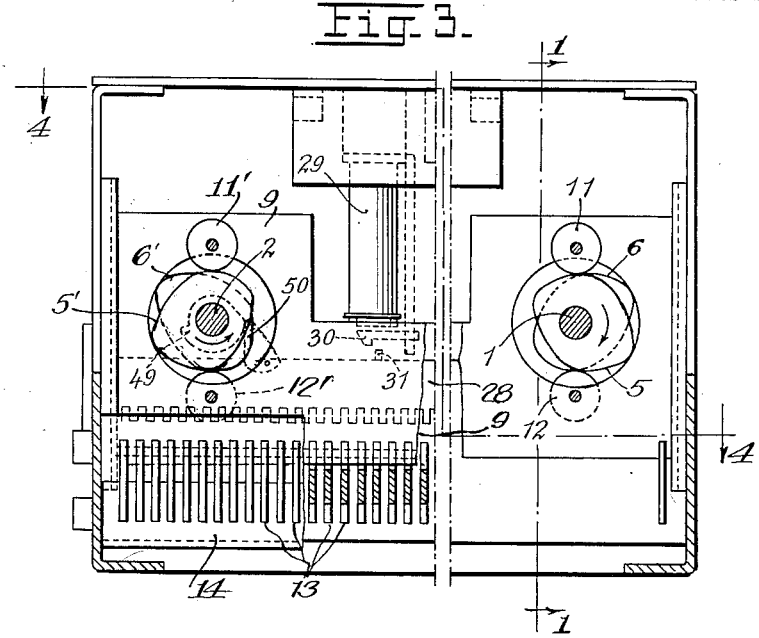
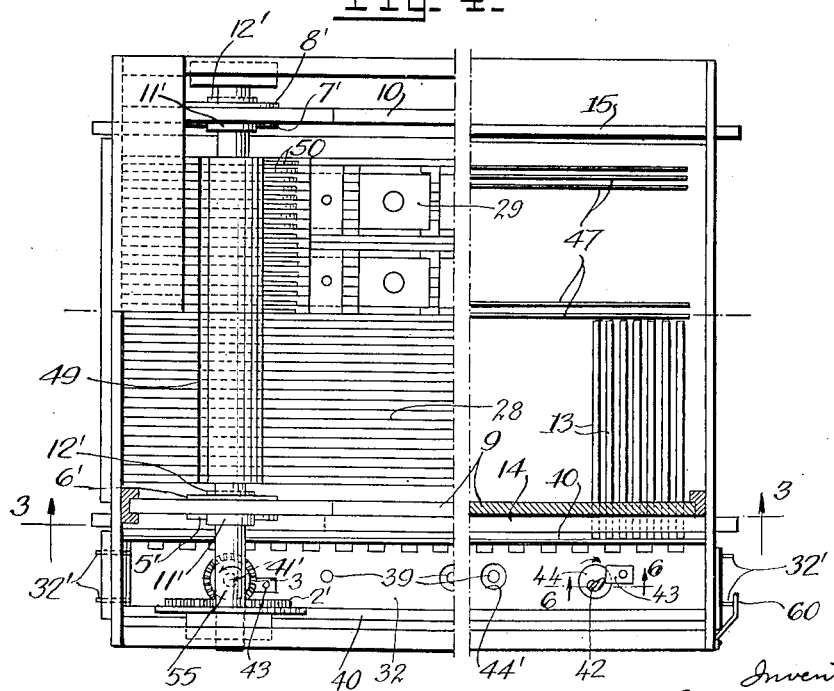

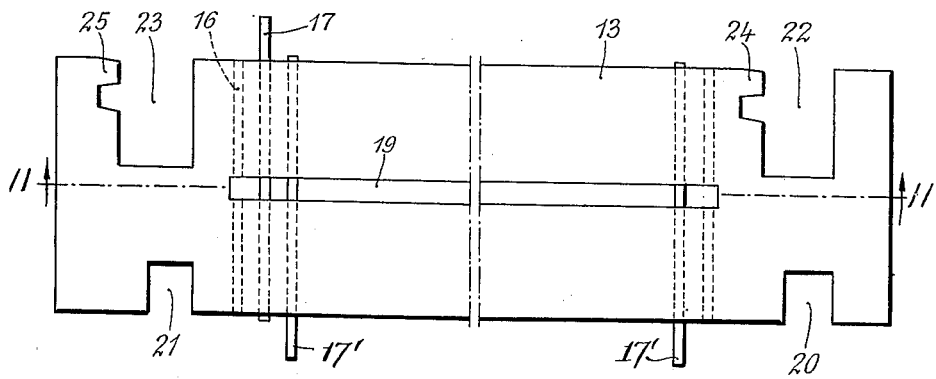
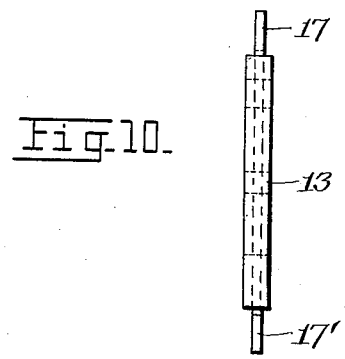
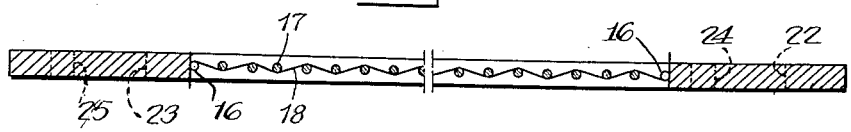

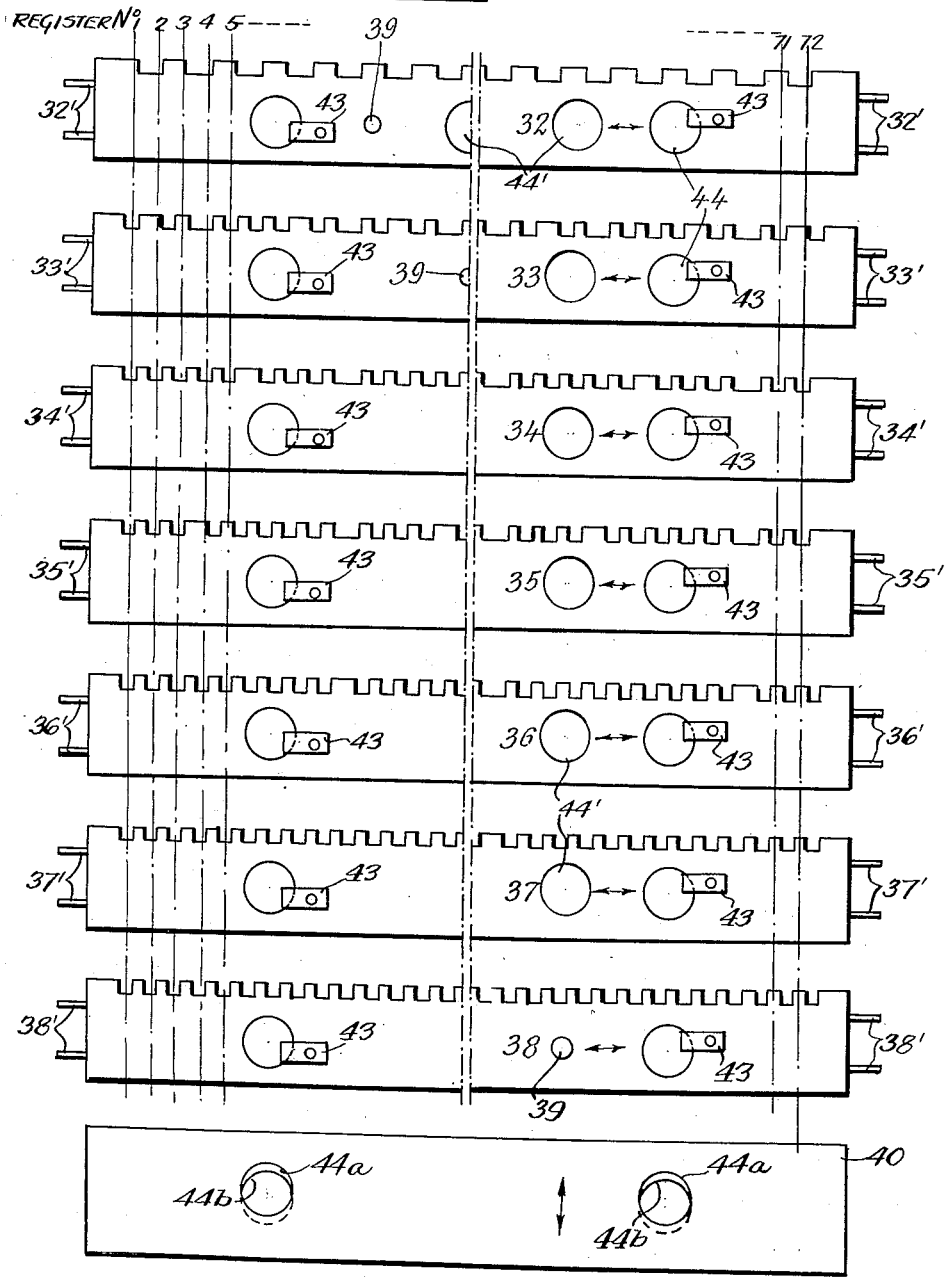

Dec. 18, 1951  R. HOFGAARD  2,579,000
REGISTERING DEVICE

Filed Dec. 4, 1946  5 Sheets-Sheet 5

Inventor:-
Rolf Hofgaard,
By Pierce, Scheffler - Parker,
Attorneys.

UNITED STATES PATENT OFFICE 2,579,000

REGISTERING DEVICE

Rolf Hofgaard, Nordstrandshogda, near Oslo, Norway

Application December 4, 1946, Serial No. 714,069
In Norway April 29, 1946

5 Claims. (Cl. 235—61)

The present invention has for its object the provisions of a registering device for automatic registering or recording of numerals or other combinations of signs or letters in such a manner that the numerals or the like introduced into the register are kept stored in the same as long as is desired, in order to be utilised at a suitable moment for transmitting impulses to other mechanisms or devices.

Registering devices of this type are particularly adapted for use in connection with automatically, electrically or pneumatically driven book-keeping and calculating machines and the like, but the registering device in accordance with the invention may also be utilised in other combinations for instance in connection with coding and decoding machines and the like.

The registering device in accordance with the present invention comprises a number of individual registers corresponding to the number of accounts or the like, for which the registering device is to be adapted. Each individual register comprises adjustable contact pins, which may be caused by a movement of the register to close electrical control circuits in the case where they have previously been placed in a certain actuated position. The contact pins are mounted with their axes parallel to each other and when the object of the device is to register or record numerical values they may be arranged in groups of four. The four pins of each group representing the digits 1, 2, 2 and 4, whereby it is made possible by suitable combinations of the four pins to produce nine different impulses corresponding to the digits 1–9.

Each register may comprise an elongated plate provided with a number of parallel bores adapted to serve as guides for the contact pins, and the plates are arranged in such a manner that they may be caused to perform a movement in the axial direction of the contact pins. The contact pins are so mounted in the said bores that they may be displaced therein in their axial direction when pressure is exerted against one of the ends of the pins.

A number of registers of this type are placed closely together and some distance above them there is mounted a number of toothed racks, corresponding to the number of pins in each register, said racks being adapted to be displaced in their longitudinal direction.

These racks are normally so placed that the upper ends of the contact pins in the registers fit into the gaps between the rack teeth when a register is moved upwards towards the racks, but when a rack is displaced by the width of a tooth in its longitudinal direction, the contact pins below this rack will be brought into engagement with the teeth, whereby they will be displaced in their axial direction with relation to their register.

The registers are also adapted to be displaced in their longitudinal direction and are under the influence of springs or the like, so that they always tend to move in one particular direction.

The selection of the particular register in which a number or the like is to be registered, is obtained by arranging all registers adjacent a number of superposed racks with different toothing in such a manner that a certain relative adjustment of these racks will bring a gap between two teeth in all superposed racks into line with the register to be selected so that this register, but not others, may be displaced longitudinally, whereby it is brought into engagement with a mechanism for moving the said register downward against underlying electrical contact rails and upward again towards the racks placed crosswise above the register.

The above mentioned racks with different toothing which normally prevent the longitudinal movement of the registers are spring actuated so that they have a tendency to move in one direction, said movement being normally prevented by means of electro-magnetically controlled locking pins or the like which are released for those racks which have to be displaced in order to bring continuous gaps in line with the particular register selected.

The displaceable racks with different toothing operate, as will be understood, in accordance with a principle similar to that which is used in combination locks and the like.

The impulses produced when the contact pins of a register close electrical circuits by engaging the underlying contact rails may be conducted to an automatic calculating machine, being utilised as an element in a calculating operation, or they may be utilised in some other manner for instance for actuating a printing mechanism, selecting a register card, or the like.

In the case where the actuation of a particular register only takes place with the object of reading or recording the numerals or the like stored in the register, and no change in this number is to take place by addition, subtraction or the like, the current circuits closed by the contact pins of the register are caused to actuate releasing mechanisms for the racks mounted above the registers, so that the racks corresponding to the active contact pins are displaced and thereby cause the said pins to return to their original position, when the register after having been pressed against the contact rails is moved upward to engage the racks.

A preferred embodiment of the register will be described in the following description with reference to the drawings.

This particular embodiment of the invention is specially adapted for use in connection with an automatic bookkeeping machine and the individual registers in that case represent different accounts and are adapted to cooperate with an automatic calculating machine and perforated register cards as well as with an automatic printing device to record the instantaneous balance for individual accounts. The registering device illustrated in the drawing and described may, however, with small and unimportant modifications, also be utilised for other purposes and in combination with other types of machinery.

In the accompanying drawing:

Figure 1 is a cross-section through a registering device embodying the invention and taken substantially on the vertical plane indicated by section line 1—1 of Fig. 3; Fig. 2 is a fragmentary elevation of one of the gear transmissions used.

Fig. 3 is a fragmentary longitudinal vertical section on line 3—3 of Fig. 4, and with parts omitted from the right-hand portion of the view for clarity of illustration; Fig. 4 is a fragmentary horizontal section on line 4—4 of Fig. 3, and with parts omitted for clarity of illustration.

Figure 5 is a diagrammatical view of a cam disk device for controlling the movement of the registers and this figure also indicates the sequence of the different operations, which takes place during one complete revolution of the main driving shaft of the registering device.

Figure 6 is a fragmentary vertical section on line 6—6 of Fig. 4 and on an enlarged scale, of the selection device for the registers, some of the parts associated with the control shaft being shown in dotted lines.

Figure 7 is a section on the line 7—7 of Figure 6.

Figure 8 is a section on the line 8—8 of Figure 6.

Figure 9 is a view on a larger scale of a register. Figure 10 is an end view.

Figure 11 is an axial longitudinal section through a register on the line 11—11 of Figure 9.

Figure 12 is a view of the displaceable racks with different toothing, which form the selection device for the registers.

Figure 13:
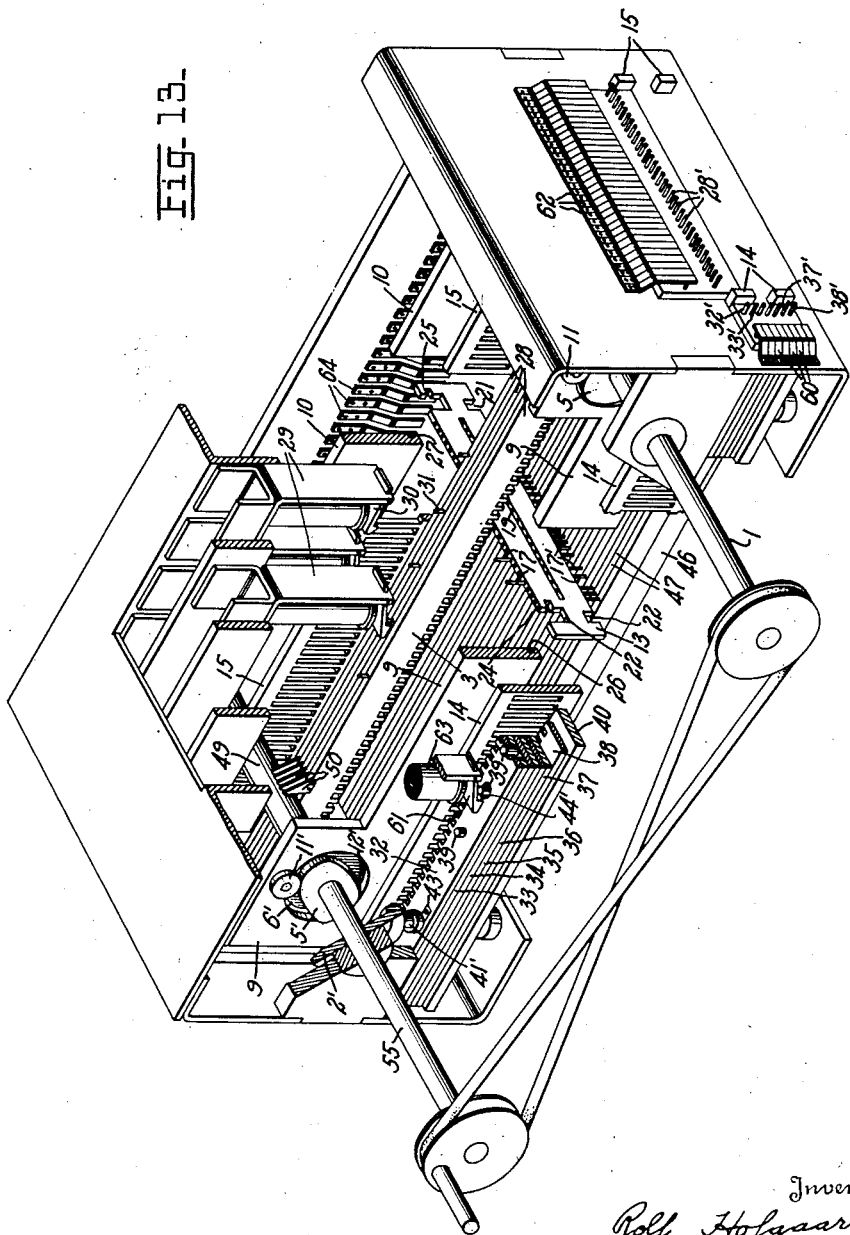
Fig. 13 is a perspective view of the registering device as seen from the rear, with parts broken away, and with only one register and a few rack bars shown for clarity of illustration.

The registering device is provided with two main shafts 1 and 55 which are driven in synchronism from a suitable driving device (for instance an electric motor), which is not illustrated on the drawing, but which is adapted to turn both driving shafts one revolution each time it is brought into operation.

On the shaft 1 is mounted a bevel gear 2, which as will be seen in Figure 2, is provided with teeth on ⅓ of its circumference only. Bevel gear 2 meshes with a bevel pinion 3, the diameter of which is ⅓ of the diameter of the bevel gear 2, and which in its normal position as illustrated in Figure 2, meshes with the toothed part of the bevel gear 2 in the centre of this part. The bevel gear 3 is carried by a shaft 41, which will be described later, and an interrupted bevel gear 2', similar to gear 2, is mounted on the shaft 55 and meshes with a bevel gear 3 on a second shaft 41'. The shafts 1 and 55 rotate in opposite directions as indicated by the arrows in Fig. 3, and the shafts 41, 41' therefore rotate in opposite directions as indicated by the arrows in Fig. 4.

Owing to the ratio between the gears 2, 2' and 3 it will be understood that one full revolution of the gear 2 causes one full revolution of the gears 3 in two separated steps, first one half revolution corresponding to the first 60° rotation of the gears 2, 2', then a stationary condition during the next 240° rotation of the gears 2, 2' and finally again ½ rotation of the gears 3 during the last 60° rotation of the gears 2, 2', after which the original position as illustrated in Figure 2 is again arrived at.

On the shaft 1 there are further mounted cam devices comprising two pairs of cam disks, 5, 6 and 7, 8 respectively.

These cam disks as it will be seen from Figure 5, are of congruent shape but reversed with relation to each other in order to provide compulsory guiding movement for vertically movable rails 9, 10 extending downward on both sides of a bank of registers 13, and the object of which, as will be apparent from the following description, is to impart movement to the registers in a vertical direction. The guiding rails 9 and 10 for this purpose are provided with rollers 11 and 12, as illustrated in Figures 3 and 5, each roller engaging one of the cam disks 5—8. Similar sets of cam disks 5', 6' and 7', 8' are provided on the shaft 55 and cooperate with sets of idler rollers 11', 12' mounted at the forward ends of the rails 9, 10 to impart a corresponding vertical movement to the forward ends of the rails. Each cam disk 5'—8' is a reversed or mirror image of the correspondingly numbered cam 5—8 since the shafts 1 and 55 rotate in opposite directions. The registers 13, as illustrated in detail in Figures 9, 10 and 11, each comprises an elongated plate having a particular form, which will be described in the following, and are mounted on stationary rails 14, 15 in the lower part of the registering device. The registering device comprises a number of these registers corresponding to the number of accounts to be carried.

As it will be seen from Figures 9, 10 and 11, the plates forming registers 13 are provided with a number of bores 16, serving as guides for contact pins 17. The axes of said bores are perpendicular in the longitudinal direction of the plates and parallel with their side surfaces.

The number of contact pins depends on the number of digits which it is desired to store in each particular register. In accordance with the system described in the introduction to this specification, and in which each numeral is indicated by means of four contacts, representing the numbers 1, 2, 2 and 4, 64 contact pins are required for storing a number with 16 digits.

Contact pins 17 are movable in their axial direction in the bores 16 and are maintained in position by means of a metallic spring ribbon 18 (Fig. 11), which is placed zig-zag about the contact pins in a slot 19 in register 13 (Fig. 9).

The several registers 13 rest upon and are supported in normal, inactive position by the stationary carrying rails 14, 15, and each register has notches 20, 21 in its lower edge which are located to the left of the rails 14, 15 respectively when the register is in inactive position but which are in vertical alinement with the rails 14, 15 when a selected register is displaced to the right, as seen in Fig. 1, thereby to permit a downward movement of the selected register.

At their upper edge the registers 13 near their ends are provided with notches 22, 23, having on one side projecting noses 24, 25 by means of which the registers when displaced towards the right engage notches 26, 27 in the guiding rails 9 and 10, see Fig. 1.

Above the registers and closely adjacent the same there is located a number of racks 28, with uniform toothing as illustrated in Figures 1 and 3. One rack of this type is provided for each contact pin of the registers, and the toothing is so arranged that, when the racks 28 are each in their normal position, the contact pins which lie below each rack will be in line with the notch between two teeth and accordingly will not be moved from elevated position, as shown by raised pins 17 in Figs. 9 and 10, when a selected register 13 is lifted towards the racks 28 during a cycle of operation of the apparatus. The several racks 28 are supported for sliding movement by pairs of pins 28' which project longitudinally from each end of the respective racks and extend through the supporting frame of the register, the racks being yieldingly urged forwardly, or to the left as viewed in Fig. 13, by springs 62 which bear against a pin 28' of each register.

Above the racks 28 there is mounted a series of electro-magnets 29, one for each rack, and these electro-magnets are adapted are adapted, when energized, to lift into inoperative position the locking hooks 30 which normally engage pins or projections 31 on the upper edge of the racks, thereby to keep the racks in normal position. Upon the lifting of the locking hook of any rack 28, that rack is moved forwardly by its spring 62, and its teeth are then located in vertical alinement with the several registers 13. When a selected register 13 is lifted towards the racks 28 by rails 9, 10, as will be described later, the register pins beneath the displaced racks will engage the rack teeth and be depressed into active position, as illustrated by pin 17', Figs. 9, 10.

The selection mechanism for the registers comprises a number of superposed racks 32, 33, 34, 35, 36, 37 and 38, which are separately illustrated in Figure 12, and which are also seen in Figs. 1 and 13. The selection racks are in the form of elongated plates which are stacked in vertical alinement and extend along one side of the machine at right angles to the series of registers 13. The selection racks are supported for individual sliding movement from a normal inoperative position into an active displaced position, to the left as viewed in Fig. 13, by pairs of pins 32' to 38' which project longitudinally from each end of the respective selection racks 32 to 38 and extend through openings in the supporting frame or bearing blocks secured thereto.

The selection racks are provided with notches along their edges adjacent the registers 13, and these notches are differentially arranged as shown in Fig. 12 in such manner that one, and only one, vertically disposed passage for receiving the right hand edge of a register is provided by any and all combinations of displaced selection racks 32 to 38. Since there are seven selection racks, and each may have either of two end positions, there are 2⁷ or 128 different relative positions of the selection racks which will provide a vertically alined notch or groove for the selection of a particular register 13. For an embodiment of the invention which included only 72, and not the possible maximum of 128 registers 13, the paths of movement of some of the registers 13 into operative position are indicated by the broken lines identified by the legend "Register 1 . . . 72" of Fig. 12. As illustrated, the selection racks 33 to 38 have notches at their left ends, as viewed in Fig. 12, which are alined with the No. 1 register 13 in the normal or non-displaced positions of the several racks, but the extreme left notch of the rack 32 is to the right of the register No. 1 when the coding rack 32 is in normal non-displaced position. Upon movement of the rack 32 to the left, the extreme left notch of rack 32 will be alined with the several extreme left notches of racks 33 to 38 to permit a displacement of No. 1 register 13 to the right, as seen in Fig. 1, thereby to support the selected register upon the vertically movable plates 9 and 10 for vertical displacement of the register. In similar manner, the No. 2 register may be displaced to the right and into operative position upon a movement of the code rack 33 to the left, as seen in Fig. 12, since the racks 32 and 34 to 38 have notches which aline with the No. 2 register 13 when these racks are in normal position. The code rack 33 has a tooth which is normally alined with the No. 2 register but, upon displacement of the rack 33, the blocking tooth is shifted to the left and a notch is alined vertically with notches of the other code racks to permit movement of the No. 2 register 13 to the right. The code selection of a register 13 may require a shift of a plurality of the coding racks 32 to 38 from normal position. For example, as illustrated in Fig. 12, only the coding racks 32, 34 and 35 have notches which aline with the No. 72 register 13 when the coding racks are in normal position, and therefore the four racks 33, 36, 37 and 38 must be shifted to bring their respective right-hand notches into vertical alinement with the corresponding end notches of racks 32, 34 and 35 when the No. 72 register is to be selected.

Individual leaf springs 60 bear against a supporting pin of each of the code selection racks 32–38 and urge the racks towards the left, as viewed in Figs. 4 and 13. The racks are normally latched against such displacement by pins 39 which extend upwardly from the several racks and have their upper ends trapped by the hooked ends of armatures 61 which are controlled by individual solenoids 63. The latch pins 39 of racks 33 to 38 extend through openings 44' in each of the racks above the particular one which carries a latch pin, and the openings are of such size as to allow free movement of any rack by its spring 60 when that rack is released for movement by energization of its associated solenoid 63 to lift its latching armature 61.

The cam sections 42 of shafts 41, 41' extend through openings 44 at the opposite end portions of the code selection racks 32–38, and cam follower plates 43 are secured to the several racks and project into the openings 44, 44, see Figs. 4, 6 and 12, for engagement by the cam sections 42 during the final 180° rotation of shafts 41, 41' by their gears 3 which mesh with the interrupted gears 2, 2' respectively. This engagement returns any displaced racks to normal position during the final 60° of rotation of the shafts 1 and 55, see Fig. 4, and the first 180° rotation of the shafts 41, 41' during the initial stages of the next cycle of operations turns the cam sections 42 to clear the cam follower plates 43, thereby permitting springs 60 to move to the left, Fig. 4, any rack 32–38 whose latch pin 39 was released by a lifting of the associated latch hook 61.

A stop and resetting plate 40 is arranged below the racks 32–38 and comprises a rectangular bar with openings adjacent its ends through which the shafts 41, 41' pass. The openings are formed by the overlapping of circular recesses 44a and 44b at the upper and the lower faces, respectively, of the stop plate 40, the upper recesses being eccentric to the axes of shafts to receive eccentrics 53 on the shafts, and the lower recesses being coaxial with their associated shafts and affording clearance to permit movement of stop plate 40 to the right, as viewed in Fig. 1 and then back to normal position by the eccentrics 53. The edge of the plate 40 projects beyond the toothed edges of the selection racks 32 to 38 at the end of a cycle of operation, see Figs. 1, 4 and 13, and forms a stop against which the bank of registers 13 are yieldingly pressed by individual leaf springs 64, see Figs. 1 and 13. The stop plate 40 is shifted to the right, as seen in Fig. 1, by the eccentric sections 53 of shafts 41, 41'. Upon a half-rotation of the same during the initial stage of a cycle of operation, and the springs 64 then press the bank of registers against the notched edges of the code selection racks 32 to 38. Only one vertical alinement of the notches of the code selection rack is afforded by any coded selection of the racks 32 to 38 which are displaced into active position, and therefore only one register may be displaced to the right, as viewed in Fig. 1, into coupled arrangement with the vertically movable rails 9 and 10.

The introduction of a number into an individual register now takes place in the following manner:

Before actuation of the illustrated apparatus, electrical circuits are key-controlled to energize one or more of the latching solenoids 63 to lift armature latches 61 above the pins 39 of one or more of the coding racks 32 to 38 to select the particular register 13 which is to be affected by the entry of an item or value. The electrical circuits for controlling and/or responsive to the displacement of contact pins 17' include contact rails 47 set in the insulating base 46, there being a contact rail directly beneath and individual to each value-significant rack 28. The circuits are not illustrated since they may be of various types and construction according to the particular function of the complete apparatus assembly in which a registering device according to this invention is incorporated. Assuming that the registering apparatus is an element of an electrically controlled "bookkeeping machine," the contact rails 47 may be connected to an adding machine unit to enter therein the value stored in the selected register and to a printing unit which enters the stored value or old balance on a record sheet. The old balance would be added to the new amount, which was entered in the adding machine unit by key-controlled circuits prior to the initiation of a cycle of operation of the registering device, and the adding machine unit would establish new circuit connections significant of the new balance. At an appropriate point in the cycle of operation of the registering device, these new circuits would be completed to energize those solenoids 29 whose latches 30 control the particular combination of value-significant racks 28 which corresponds to the new balance.

After manual operation of the keys which select a register 13 and the keys which enter the new item or amount in the adding machine unit, the apparatus is actuated manually or by a motor, not shown, to effect a single rotation of shafts 1 and 55. For simplicity of explanation, only the operation as affected by shaft 1 will be described.

When the main driving shaft 1 (see Figure 5) starts its movement in the clockwise direction as indicated by the arrow, rollers 11, 12 first travel along a circular path on the cam disks 5 and 6 respectively and accordingly remain in their position. When shaft 1 starts its rotation from its normal rest position at which its top point A lies in the radial plane indicated by reference line $a$ of Fig. 5, the cam sections 42 of the shafts 41, 41' are rotated to clear the plates 43 of the several code selection plates 32 to 38 when the point A of shaft 1 is moved through 30° into radial plane $b$. The code selection racks which were selectively released for displacement are now moved to their left, as viewed in Fig. 13, by the associated springs 60. At about the same time, the stop plate 40 is shifted to the right, as view in Fig. 1, by the cam sections 53 of shafts 41, 41', thereby to permit movement of the selected register 13 to the right into supported engagement with the vertically movable rails 9, 10. When the point A of shaft 1 reaches the radial plane $c$ on a 60° rotation of the shaft 1, the end points 45, 45' of the circular sections of the cams 5, 6 respectively are in engagement with the rollers 11, 12 respectively. Beyond the point 45, the cam 5 is of reduced diameter whereas the cam 6 is of enlarged diameter beyond the point 45'. Further rotation of the shaft 1 carries the reference point A to the radial plane $d$, thereby depressing the rails 9, 10 and the selected register 13 which they carry, into extreme lower position since the major diameter point 48' of the cam 6 is then in engagement with the idler 12.

During this lowering of the selected register 13, the depressed contact pins 17' engage their associated contact rails 47 to close electrical circuits to electrically actuated units, not shown, of the complete business machine. In the case of a bookkeeping machine, the energized circuits will extend to an adding machine unit and to a printing unit to enter therein the particular number or amount stored in the register 13 by the displaced pins 17'. Immediately after the initial engagement of the displaced pins 17' with their contact rails 47, all circuits to the rails 47 are opened by means of switches, not shown, which are directly or indirectly actuated by the shaft 1. During the continued downward movement of the selected register 13, all of the displaced pins 17' are restored to their non-actuated positions in transverse alinement with the previously non-displaced pin 17, Fig. 9.

Rotation of shaft reference point A through radial planes $e$ and $f$ lifts the rails 9, 10 and the selected register 13 back to normal positions and, during this interval, the shaft 1 actuates switches, not shown, to energize those solenoids 29 which correspond to the new balance to be entered into the selected register 13. Certain racks 28 are thereby released for displacement to the left, as seen in Fig. 13, to aline teeth of these value-significant racks 28 with pins 17 of the selected register 13. This longitudinal displacement of the released racks 28 by their springs 62 is permited by the rotation of cam 49 of shaft 55 to clear the lugs 50 on the racks 28 when the point A of shaft 1 reaches radial plane $g$. When the shaft point A reaches radial plane $h$, the rails 9, 10 are in extreme upper position as the high point 48 of cam 5 is then in engagement with the idler roller 11. The pins 17 of the selected register 13 contact the teeth of the displaced racks 28 to enter the new balance into the register. When point A of the shaft 1 reaches the radial plane $i$, the interrupted gear 2 again meshes with the gear 3 to rotate the shaft 41. During movement of shaft point A from plane $h$ position to plane $i$, the rails 9, 10 are returned to normal positions, and on movement from plane $i$ to plane $j$, the cam section 53 of shaft 41 moves the resetting plate 48 to the left, as viewed in Fig. 1, to return the selected register 13 and all other registers 13 to their normal inactive positions, and during movement of shaft point A from plane $j$ back to its initial position, the cam section 42 of shaft 41 engages the plates 43 of the code selection racks 32 to 38 to restore all displaced racks to normal inactive position. The apparatus is thereby reset to another cycle of operation.

In the embodiment herein described it is presumed that the contact pins are adapted to be moved axially. Obviously, however, the principle forming the basis of the invention may also be utilised in connection with contact pins, adapted to perform a tilting movement or a turning movement about their axes, as this only presumes a corresponding other form of the teeth of the racks 28 and of the contact rails 47 so that the latter, by their engagement with the contact pins will tilt or turn the same back to the position they had before they were adjusted by means of the teeth on the racks 28.

I claim:

1. Registering device for storing and transmitting impulses adapted to be used for instance for calculating machines, book-keeping machines, etc., comprising a number of registers in the form of elongated plates each carrying movable contact pins in parallel arrangement normal to the length of the elongated plates, a series of notched racks above and at right angles to said registers, the notches of said racks being normally alined with said contact pins to prevent actuation thereof when a selected register is moved towards said racks, an insulating base below said registers and provided with a series of contact strips equal in number to the number of contact pins of a register, code means for selecting a desired register for the entry of an accumulated value, actuating means for moving the selected register towards said insulating base to engage the activated contact pins thereof with contact strips and then to press the activated contact pins back to normal inactive position, said actuating means then moving the select register towards said notched racks and back to normal inactive position, means controlled by the electrical circuits established by said contact pins and contact strips for displacing those notched racks corresponding to the accumulated value to bring the teeth of such racks into alinement with contact pins of the selected register to move into active position the contact pins corresponding to the accumulated value.

2. Registering device as claimed in claim 1, characterised in this that each elongated plate register is provided perpendicularly to its longitudinal direction and parallel with its side surfaces with bores to receive slidable contact pins which are maintained in their position by suitable friction means.

3. Registering device as claimed in claim 1 wherein said code means comprises superposed racks provided with different toothing and adapted to be so adjusted that they may take up a number of different relative positions corresponding to the number of registers, the teeth of the code racks being so determined that in each of the said different relative positions there will be a continuous tooth gap in line with one of said registers for permitting the same to continue its spring actuated movement.

4. Registering device as claimed in claim 1, characterised in this that registers during their movement towards underlying contact strips are carried so far downward that all contact pins are pushed into their upper position with relation to register, current circuits through the contact rails being interrupted automaticallly before the register reaches its lower position.

5. Registering device for storing and transmitting impulses adapted to be used for instance for calculating machines, bookkeeping machines, etc., comprising a number of registers in the form of elongated plates each carrying movable contact pins in parallel arrangement normal to the length of the elongated plates, a series of notched racks above and at right angles to said registers, the notches of said racks being normally alined with said contact pins to prevent actuation thereof when a selected register is moved towards said racks, an insulating base below said registers and provided with a series of contact strips equal in number to the number of contact pins of a register, a pair of rails for supporting a selected register for cyclic movement towards said insulating base and then towards said notched rack before the return to normal inactive position, a plurality of notched code selector rails extending across the ends of said register, said selector rails being individually movable to aline notches thereof to form a recess for receiving the end of a selected register to permit movement thereof into supported position upon said rails, stopper means normally preventing movement of all registers towards supported position on said rails, operating means for displacing said stopping means into inoperative position during the initial period of a cycle of operation and for then imparting said cyclic movement to said pair of supporting rails, thereby to engage the activated contact pins of the selected register with contact strips on said insulating base and to restore said activated pins to normal position upon further downward movement of the selected register by said supporting rails, and means controlled by the closing of electrical circuits by said activated contact pins and contact strips to displace those notched racks corresponding to the accumulated value to bring teeth thereof in alinement with contact pins of the selected register, whereby the accumulated value is entered in the selected register by displacement of contact pins thereof upon movement of the selected register toward said notched racks, said operating means returning said stopping means to operative positive position near the close of a cycle of operation, thereby to return the selected register to inactive position.

ROLF HOFGAARD.

REFERENCES CITED

The following references are of record in the file of this patent:

UNITED STATES PATENTS

| Number | Name | Date |
| --- | --- | --- |
| 2,369,430 | Brand et al. | Feb. 13, 1945 |
| 2,405,287 | Brand et al. | Aug. 6, 1946 |